United States Patent
Yellowlees

[15] 3,698,363
[45] Oct. 17, 1972

[54] ONCE-THROUGH BOILERS

[72] Inventor: John Mackinlay Yellowlees, Knutsford, England

[73] Assignee: The Nuclear Power Group, Limited, Knutsford, England

[22] Filed: Dec. 22, 1970

[21] Appl. No.: 100,723

[30] Foreign Application Priority Data

Dec. 24, 1969   Great Britain..........62,781/69

[52] U.S. Cl.............................122/406 S, 122/451 S
[51] Int. Cl.............................................F22b 29/02
[58] Field of Search....122/406, 451, 451 S, 452, 456

[56] References Cited

UNITED STATES PATENTS 1,938,916   12/1933   Lieberherr................122/451
3,070,077   12/1962   Huet..........................122/451

FOREIGN PATENTS OR APPLICATIONS 919,980   2/1963   Great Britain.............122/451

Primary Examiner—Kenneth W. Sprague
Attorney—Holman & Stern

[57] ABSTRACT

A 'once-through' boiler which is provided with a water storage drum connected to the boiler inlet and carries a head of water sufficient to maintain a supply of water to the tubes in the event of failure of external water supply to the boiler.

4 Claims, 2 Drawing Figures

ONCE-THROUGH BOILERS

BACKGROUND OF THE INVENTION

This invention relates to 'once-through' boilers. 'Once-through' boilers differ from normal drum-type boilers in that water flows in tubes once through the combustion space of the boiler, instead of being recirculated a number of times through the combustion space, before passing to a stream drum. In the 'once-through' boiler, the water in the tubes is converted to steam in the tubes.

In the application of such boilers to a nuclear reactor plant, it is necessary to employ, in some circumstances, 'once-through' boilers in which the flow of water and steam is vertically downwards. Such boilers are suitable for use with high temperature reactors where the cooling gas from the reactor flows downwards through the reactor core. With such an arrangement, hot gas leaving the lower part of the reactor enters the lower end of the boiler, flows upwards over the tubes and then passes to a space above the reactor core before re-entering the core. In this way, fuel loading and unloading equipment and control equipment, located above the reactor core, are in contact with cooling gas at a lower temperature than if the gas flowed upwards through the core.

A difficulty with 'once-through' boilers in which the flow of water and steam is downwards, is that in the event of a failure of the boiler feed pump, the water would drain from the boiler and damage to the boiler could result. The temperature of the gas passing through the gas circulators to the inlet of the reactor core may also rise excessively.

SUMMARY OF THE INVENTION

In accordance with the present invention, a 'once-through' boiler is provided with a water storage drum connected to the boiler inlet and carrying a head of water sufficient to maintain a supply of water to the tubes in the event of failure of external water supply to the boiler.

In one embodiment, a boiler feed pump is arranged to supply feed water to the 'once-through' boiler and to a circuit containing the water storage drum, with the circuit being connected between the boiler feed pump outlet and the outlet from the boiler, the part of the circuit between the storage drum and the outlet from the boiler containing a valve which is closed when the level of water in the storage drum reaches a predetermined level.

The invention also consists in a 'once-through' boiler arrangement substantially as described below with reference to the accompanying diagrammatic drawings in which:

DETAILED DESCRIPTION OF THE DRAWING

Figure 1:
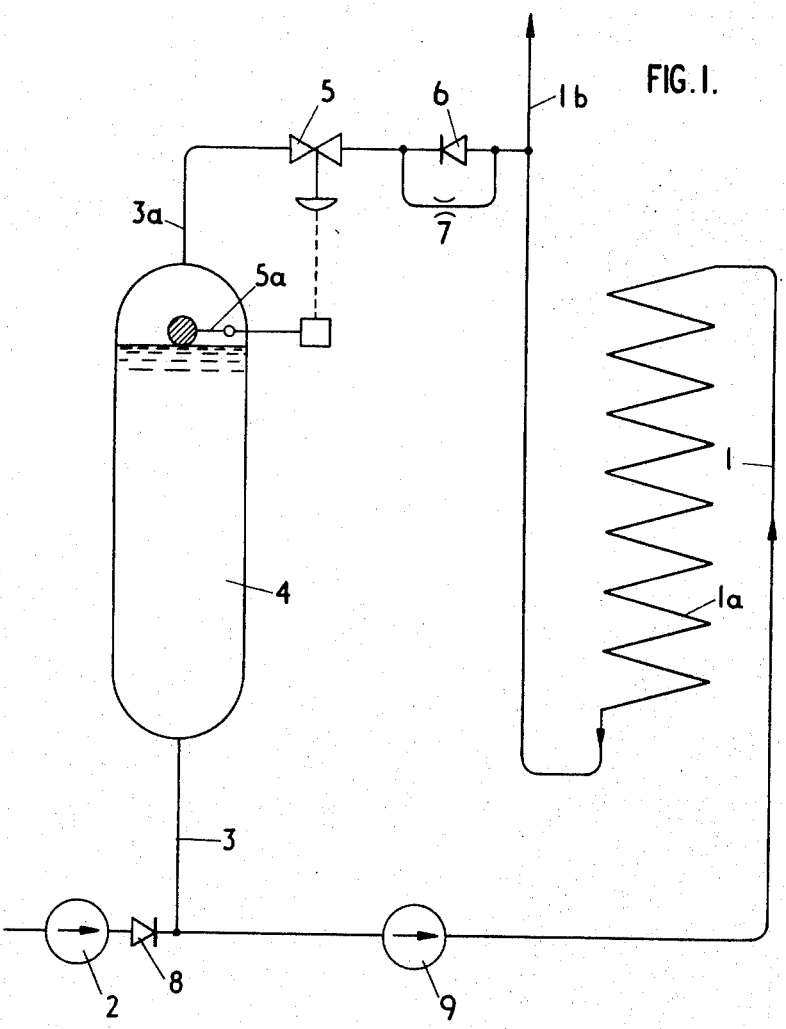
FIG. 1 shows a boiler arrangement in accordance with one embodiment of the invention.

Referring to FIG. 1, a 'once-through' boiler 1 is supplied with water by a boiler feed pump 2. The flow of water is downwards through the tubes represented diagrammatically at 1a. Steam leaves the boiler through outlet 1b.

Connected between the outlet of the boiler feed pump and the outlet 1b of the boiler is a circuit 3 containing a water storage drum 4.

The part of the circuit 3a between the storage drum and the outlet 1b of the boiler, contains a valve 5 which is closed by the action of float 5a when the water in the tank reaches a predetermined level.

Between the valve 5 and boiler outlet 1b, is a non-return valve 6 across which is fitted a bleed orifice 7. A non-return valve 8 is fitted between the boiler feed pump and the circuit 3.

In operation, when the boiler feed pump is started, the drum 4 fills with water until it reaches a predetermined level at which point valve 5 closes. The water level continues to rise until the pressure differential across the valve 5 is equal to the pressure drop across the boiler.

If for any reason the boiler feed pump stops, the water level in the storage drum falls and water is discharged into the boiler. Fall in the water level opens the valve 5. The quantity of water in the storage drum is chosen so that, at the required feed rate, there is time to bring in stand-by feed pumps. Generally speaking, the water flow will be not more than one fifth of the normal water flow, but such a flow is sufficient to protect the boiler.

If necessary an auxiliary pump 9 can be used to assist circulation of the water from drum 4. Such a pump can run continuously under normal operating conditions or can be started up automatically when the boiler feed pump stops. Such an auxiliary pump need only be capable of over-coming the pressure drop in the boiler at the reduced water flow rate obtained when the drum is supplying the water and consequently, the power demand from the pump is such that it can be supplied from batteries.

A connection 3a and associated valves make the operation of the system independent of the prevailing boiler pressure.

If there should be a leak of water past the valve 5, this is not critical as the leakage water will be converted to steam in the boiler outlet 1b. If desired, however, more than one stop valve can be used to reduce leakage. While a ball float arm arrangement has been shown, other arrangements are possible, for example, a needle valve floating on the surface of the water can be used to close the connection 3a. In some instances, the need for any form of stop valve may be eliminated if it is acceptable to have a small leakage governed by bleed orifice 7.

Figure 2:
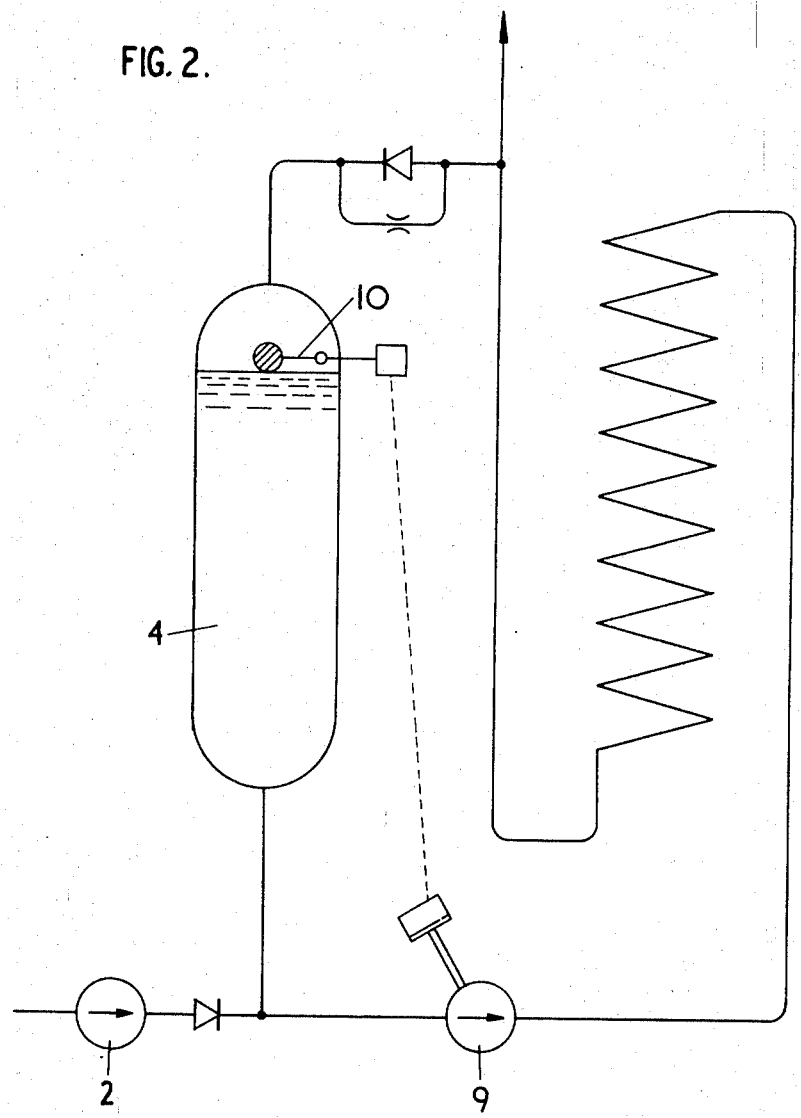
FIG. 2 shows an alternative embodiment of the invention.

In an alternative arrangement shown in FIG. 2, the water level in the drum 4 is maintained at a predetermined level by a float 10 the position of which is used to regulate the speed of auxiliary pump 9, which runs continuously, in such a way that the pressure head of water in the drum 4 always equals the pressure drop through the boiler less the pressure rise across the auxiliary pump.

The arrangement described is particularly suitable for nuclear reactors where collant flows downwards through the reactor core then upwards over the tubes of the boiler. The tube banks of the boiler could be located in a space within a concrete vessel housing the reactor core so that they are in the path of the reactor collant as it leaves the lower part of reactor core to return to a space above the core.

Although the above description relates to 'once-through' boilers in which the flow of water and steam is vertically downwards the invention can also be applied to 'once-through' boilers in which the water and steam flow vertically upwards. Its principal purpose is then to maintain a sufficient quantity of water in the boilers until the emergency feed pumps can be brought into operation following failure of the main feed supply system. In this way damaging temperature transients can be prevented.

I claim:

1. A 'once-through' boiler feed system for a boiler having an inlet and an outlet, a boiler inlet feed pump, a feed pipe between the feed pump and the boiler inlet, an auxiliary pump for the feed pipe bypassing the inlet feed pump, a water storage drum having a feed pipe circuit, said feed pipe circuit being connected at one end to the inlet feed pump and at the other end to the boiler outlet, and a control valve for said feed pipe circuit for enabling the storage of a sufficient head of water in the storage drum for insuring that in the event of failure of the inlet feed pump, a supply of water is maintained to the boiler via said auxiliary pump, with the flow of water from the storage drum occuring when the pressure in the feed pipe falls.

2. The boiler as claimed in claim 1, wherein the flow of water and steam through the boiler is downwards.

3. A 'once-through' boiler having an inlet, an outlet and tubes, a boiler feed pump, a feed conduit between the feed pump and the boiler inlet, a water storage drum connected to the feed conduit, said drum containing a head of water sufficient to maintain a supply of water to the tubes in the event of failure of external water supply to the boiler, a circuit including the storage drum connected between the feed pump and the boiler outlet, an auxiliary pump located between the boiler inlet and the connection of said circuit to the feed pump, a float operably related to the storage drum whereby the water level in the drum is maintained at a predetermined level by the float, and means operably connecting the float to the auxiliary pump whereby the position of the float regulates the auxiliary pump so that the pressure head of water in the storage drum always equals the pressure drop through the boiler less the pressure rise across the auxiliary pump.

4. The boiler as claimed in claim 1, wherein the part of the circuit between the storage drum and the outlet from the boiler includes a valve and, a means arranged within the boiler for closing said last named valve when the level of water in the storage drum reaches a predetermined level.

* * * * *